OSCILLATOR CONTROL SYSTEM

Filed April 18, 1952 2 Sheets-Sheet 1

INVENTOR
RICHARD W. SONNENFELDT
BY
[signature]
ATTORNEY

INVENTOR
RICHARD W. SONNENFELDT
BY
[signature]
ATTORNEY 2,802,899

OSCILLATOR CONTROL SYSTEM

Richard W. Sonnenfeldt, Haddonfield, N. J., assignor to Radio Corporation of America, a corporation of Delaware Application April 18, 1952, Serial No. 282,956

6 Claims. (Cl. 178—69.5)

This invention relates to circuits useful in color television systems and more particularly to phase detectors useful in automatic phase control of locked-in oscillators generally provided in phase modulated subcarrier color television systems.

To provide proper color operation in a television system of the phase modulated subcarrier type, a burst of energy is transmitted to establish and maintain at the receiver the phase of the local color oscillator in synchronism with the phase of the subcarrier generator at the transmitter. This burst is usually and conveniently located on the back porch of the synchronizing pulse pedestal where it may be easily gated at the receiver for comparison in phase with the local color oscillator output signal wave by a suitable phase comparator circuit. The phase comparator serves to provide a direct current control potential indicative of the phase difference between the two input signals.

Small changes of phase in the output signal of the color oscillator will cause errors in the color information of the picture and therefore precise phase control must be effected. It is particularly desirable for this reason to provide a phase comparator circuit which is insensitive to amplitude changes in the input signal waves near the region of the phase comparator null point. If this condition holds true the color oscillator will remain locked-in even though the video signal amplitude, and accordingly the gated burst amplitude, substantially changes. Because a phase comparator circuit is in general responsive to variations in both phase and amplitude it has been difficult to attain this desired relationship with conventional circuits.

A further source of phase error in automatic frequency control systems of the type described is found in transformers generally associated with phase comparator circuits. It is necessary to delicately adjust the balance of both input portions of a double ended transformer for both amplitude and phase to provide the necessary phase stability. Phase shift in the transformer must also be absolutely maintained to prevent a varying phase error due to temperature or other instability. Therefore, a phase comparator circuit having a single ended non-resonant input circuit for both signals is highly desirable in a stable system. In addition, the expense of a transformer makes it desirable to provide a transformerless single ended phase comparator circuit.

In accordance with the invention therefore, a phase comparator circuit is provided in which two signal input waves are inserted at a diode or other square law modulator to provide an output signal modulation product of the two waves. The modulation product is then demodulated by an envelope detector to convert the envelope to a direct current frequency potential, indicative of the difference in phase of the two input signals. A peak rectifier circuit is so connected to provide either a positive or negative control potential for control of a reactance tube which phases the local color oscillator with the gated burst signal from either a leading or lagging phase condition. By selecting the null or lock-in condition to occur at a position where the two waves have a phase difference of 90° this system becomes insensitive to amplitude variations at the null point and thereby affords improved operational characteristics.

It is therefore an object of the invention to provide an improved phase comparator circuit adept in precisely controlling the phase of a local oscillator in accordance with a frequency control signal.

It is a further object of the invention to provide a phase detector arranged to provide a control voltage indicative of the difference in phase between two input signals and being insensitive to amplitude variations at the balance point.

It is a further object of the invention to provide a phase comparator circuit operable with single ended input circuits.

Further objects and features of the invention will be found throughout the following detailed description, which may be readily understood when considered in connection with the accompanying drawings, in which.

Figure 1:
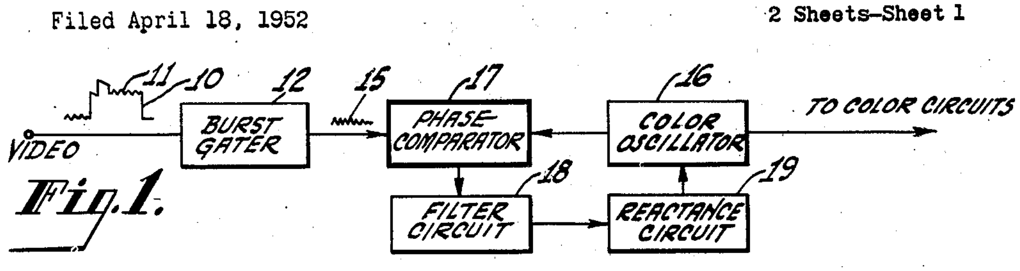
Figure 1 is a block diagram of an automatic frequency control circuit of a color television system in which the invention is specifically embodied.

Referring now more particularly to the drawing, the circuit of Figure 1 illustrate the relationship of the several functional elements found in the automatic phase control portion of a color television system operating on a phase modulated subcarrier principle. In this type of system the video signal 10 has superimposed upon the back porch of sync a short burst 11 of energy at the subcarrier frequency. This burst is used to synchronize a local color oscillator or subcarrier generator in the same phase as the subcarrier generator of the transmitter.

The burst is separated from the video signal by a suitable gater circuit 12. Both the gated burst 15 and an oscillator signal from the local color oscillator 16 are inserted at the phase comparator circuit 17 to establish a phase control potential which is indicative of the phase difference of two input signals. The output control signal is filtered by a suitable circuit 18 to provide a varying direct current potential for operating the reactant circuit 19 thereby maintaining the phase of the color oscillator 16 in synchronism with that of the gated burst 15.

Figures 2, 3:
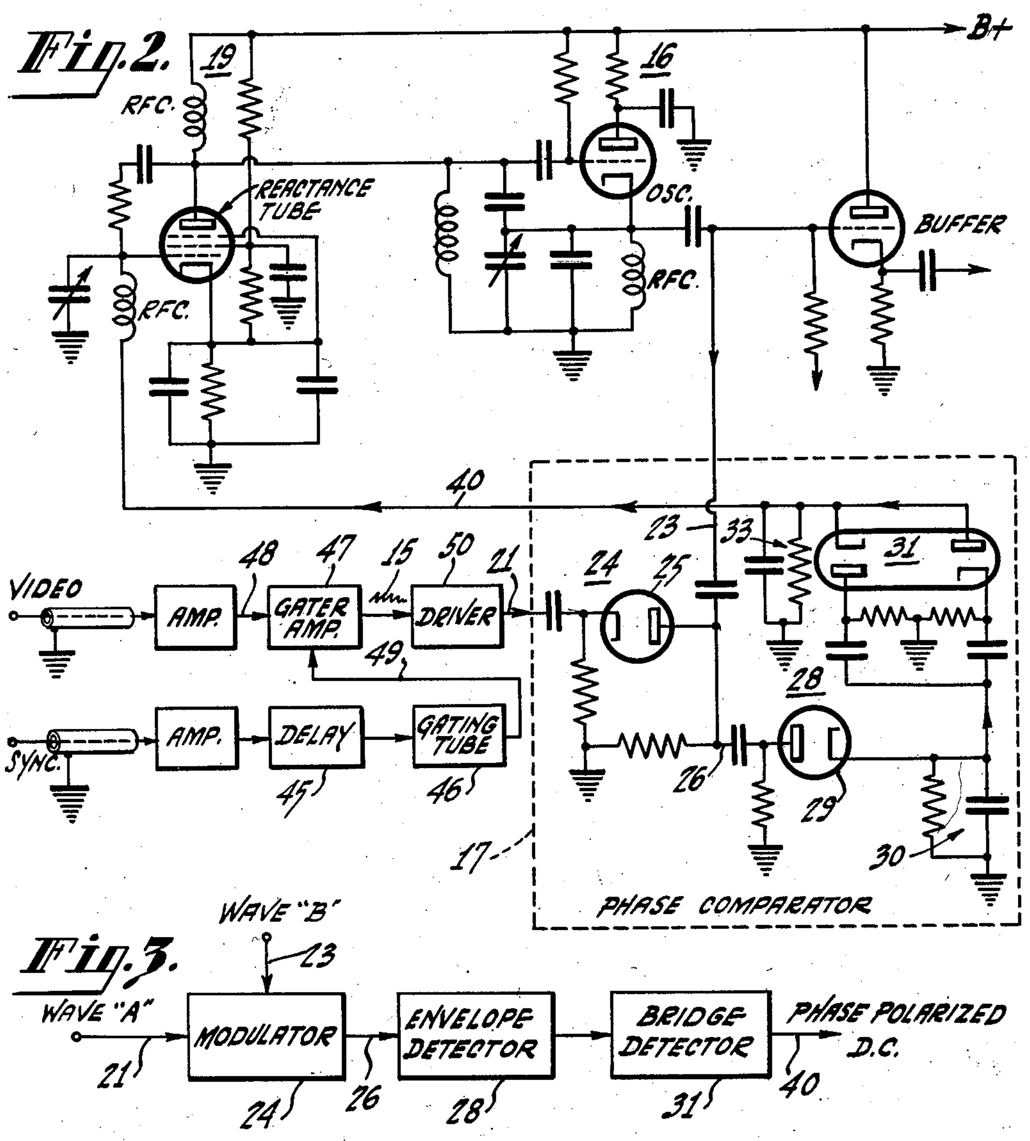
Figure 2 is a combined schematic and block diagram of a color television circuit embodying the invention.
Figure 3 is a block diagram circuit of a phase detector system constructed in accordance with the invention; and Figures *4a*, *4b*, *4c*, 5 and 6 are waveform diagrams illustrating operational features of the invention.

An improved phase comparator circuit 17 is provided in accordance with the present invention as shown more clearly in the schematic circuit enclosed in the dotted rectangle of Figure 2. Referring now to the block diagram of Figure 3 in conjunction with the explanation of operation of the phase comparator circuit 17, it is seen that two waves are provided at the input leads 21 and 23 of a modulator 24. The waves at terminals 21 and 23 may comprise continuously oscillating waves but in the specific embodiment with which the present invention is described comprise respectively the gated burst signal and the oscillator output signal. Modulation is preferably effected in the diode 25 which operates as a square law modulator in a manner well known to those skilled in the art.

An output modulation envelope may be taken as shown at lead 26 from the cathode of the modulator tube 25. It is not necessary to provide either input wave at a particular electrode and the input waves may be cross-connected should it be desirable to provide a modulation envelope having a lock-in condition representing a lagging rather than a leading phase condition of 90°. It is noted here that when the waves are to be locked-in they are displaced by the desired 90°. The modulation envelope will have an intermediate value which may be detected as a null or lock-in condition where the waves are displaced by 90°. This feature of the invention is important and shall hereinafter be explained in greater detail.

The modulated wave at lead 26 is then demodulated by means of a suitable envelope detector 28 which may comprise the diode 29. The diode 29 is preferably used since the RC time constant circuit 30 at which the output signal is developed may be selected to provide optimum envelope detection for insertion by alternating current coupling at the succeeding peak rectifier circuit 31. Alternatively the envelope could be detected in the peak detector circuit 31, if desirable, by choosing the input circuit constants to reject the oscillator or subcarrier frequency. Operation of the peak detector circuit is provided however in addition to the envelope detection to establish a null condition of zero direct current output at the point of the modulation envelope midway between in-phase and out-of-phase input wave conditions or at a portion where the waves are 90° out of phase. The time constant of the peak detector output circuit 33 therefore corresponds to that of the filter circuit 18 of Figure 1 and is of a longer duraton than that necessary for proper envelope detection. For example, the time constant should be long as compared with the gating period recurrence frequency which is the horizontal synchronizing pulse frequency of 15,750 cycles. The alternating current type of coupling between the envelope detector 28 and the peak detector 31 makes it unnecessary to balance or otherwise critically adjust the phase comparator. Thus, a D. C. potential is provided at the output lead 40 suitable for control of the reactance tube circuit 19 so that the oscillator circuit 16 may be maintained in a locked-in condition with the burst 15.

In Figure 2 the block circuits illustrate a more elaborate burst gating system corresponding to the burst gater block 12 of Figure 1. Synchronizing pulses are delayed in the circuit 45 to coincide with the back porch interval in which the burst is found. The gating tube 46 shapes the delayed sync pulse to have a time duration and amplitude sufficient to actuate the gater amplifier coincidence tube 47 to provide the output burst 15 when the video is inserted at the input lead 48 with the burst arriving in coincidence with the gating pulses at input lead 49. The driver circuit 50 then provides at the input lead 21 of the phase comparator circuit a suitable gated burst for operation in accordance with the present invention. It is to be recognized of course, that other means may be provided for deriving the gated burst signal, and that the comparator circuit is operable with two alternating input waves having different characteristics than those specifically described hereinbefore.

Figures 4A, 4B, 4C, 5, 6:
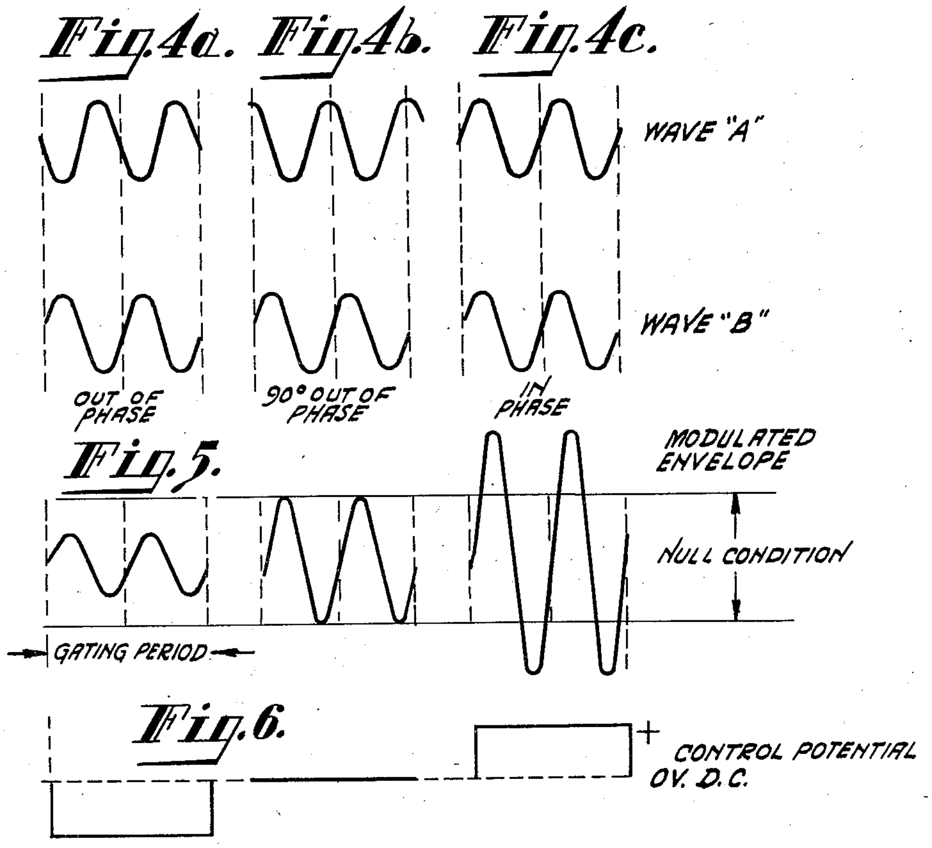

Considering now the waveforms of Figure 4 in which the gated burst, indicated as wave "B," has been shown to have a relative phase as compared with the oscillator pulse, indicated as wave "A" (and shown only during the gating periods) in three conditions respectively designated as out-of-phase (Figure 4*a*), in phase (Figure 4*c*), and 90° out of phase (Figure 4*b*). The burst is shown to contain two cycles but obviously may contain many more cycles if desired.

The modulation product of the two waves during the three conditions mentioned above will have those characteristics shown in Figure 5. That is, the minimum modulated envelope amplitude, which occurs when the out of phase condition exists, preferably has a percentage of modulation of less than 100. The envelope in this case is developed by the addition of two out of phase signals of the same frequency. Conversely, the in-phase condition will cause the waves to add thus providing the maximum modulated envelope amplitude. The midposition amplitude of the modulated envelope will thereby occur when the waves are 90° out of phase.

Modulated envelope detection provides the direct current control potentials of Figure 6 which may be converted to a longer time constant averaged direct current control potential in the RC circuit 33 as hereinbefore discussed. To provide a large modulation envelope current at the oscillator frequency, the input time constant of the modulator diode 25, anode circuit for the oscillator frequency should be short, that is of the order of or less than the oscillator frequency. A high time constant many be utilized on the gated burst input circuit at the cathode of the modulator diode 25 however so that the large current component will be indicative of the envelope variations occurring during the recurring burst. Thus, the time constant has a value in the order of the gating period.

From the foregoing description of the invention, it is readily recognized that two single-ended input circuits may be utilized in the modulator circuit 24 for the respective input waves, thus affording the advantages above described. The invention is not confined to the particular diode modulator circuit utilized but may comprise any suitable square law modulator. The square law modulator circuit is desirable since a condition exists therein when the balance point or null position is selected as the input waves are relatively displaced 90° such that the output signal applied to the peak rectifier will be independent of the amplitude of either wave. As before explained, the locked-in frequency may be maintained in such a system even though large variations of amplitude occur in the incoming signal or in the oscillator output signal, and therefore improved locked-in operation is effected by the circuit of the present invention.

Modulation of the two waves and detection of the modulated envelope to provide a direct current signal indicative of phase displacement between the input signals in accordance with the teachings of the invention thus affords improved phase control which is highly desirable in combination with color television circuits of the type described.

Having thus described the operation of the invention and its manner of construction, those features which are believed descriptive of the nature of the invention are defined with particularity in the appended claims.

What is claimed is:

1. A single ended input self-balancing phase comparator circuit insensitive to amplitude changes at the balance point comprising in combination: a modulator circuit; a pair of signal sources coupled to said modulator circuit to develop an alternating current wave having amplitude variations indicative of the phase relation of said two signals; an envelope detector circuit coupled to said modulator circuit; a peak detector including two electron tubes each having an anode and a cathode; means coupling for alternating current only the anode of one and the cathode of the other of said peak detector electron tubes to the output of said envelope detector, the other electrodes of said peak detector electron tubes being connected together and to an output circuit in which to develop a direct current output potential indicative of the phase difference of said two input signals with a null point of zero output potential indicative of a condition when said signals are 90° out of phase 2. A single ended input self-balancing phase comparator circuit insensitive to amplitude changes at the balance point comprising in combination: a diode modulator circuit; a pair of signal sources coupled respectively to the anode and cathode electrodes of said modulator diode; a diode envelope detector circuit coupled to one of the modulator diode electrodes; a double diode peak detector; means coupling for alternating current only the anode of one and the cathode of the other of said peak detector diodes to the output of said diode envelope detector, the other electrodes of said peak detector diodes being connected together and to an output circuit in which to develop a direct current output potential indicative of the phase difference of said two signals with a null point of zero output potential indicative of a condition when said signals are 90° out of phase.

3. A single ended input self-balancing phase comparator circuit insenstive to amplitude changes at the balance point comprising in combination: a pair of signal sources; means coupled to said two signal sources for modulating said signals to produce a modulation product wave having amplitude variations indicative of the phase relation of said two signals; envelope detector means coupled to said modulating means for producing a unidirectional signal having amplitude variations corresponding to the amplitude variation of said modulation product wave; peak detector means including two unidirectional conducting devices each having anodic and cathodic electrodes; means coupling for alternating current only the anodic electrode of one and the cathodic electrode of the other of said peak detector devices to the output of said envelope detector means, the other electrodes of said peak detector devices being connected together and to an output circuit in which to develop a direct current output potential indicative of the phase difference of said two signals with a null point of zero output potential indicative of a condition when said signals are 90° out of phase.

4. A single ended input self-balancing phase comparator circuit insensitive to amplitude changes at the balance point comprising in combination: a diode modulator circuit; a pair of alternating current signal sources coupled respectively to the anode and cathode electrodes of said modulator diode, said signals having substantially the same frequency; a diode envelope detector circuit coupled to one of the modulator electrodes and including an output circuit having a time constant of the same order of magnitude as the period of said two signals; a double diode peak detector including an output circuit having a time constant which is greater than the time constant of the output circuit of said diode envelope detector; means coupling for alternating current only the anode of one and the cathode of the other of said peak detector diodes to the output of said diode envelope detector, the other electrodes of said peak detector diodes being connected together and to said peak detector output circuit, whereby to develop a direct current output potential indicative of the phase difference of said two input signals with a null point of zero output potential indicative of a condition when said signals are 90° out of phase.

5. In a color television receiver for phase modulated subcarrier wave operation, the combination comprising: means separating an alternating current phase control signal from received television signals; local oscillator means to produce an alternating current wave having the same frequency as that of said phase control signal; control means for establishing and maintaining the alternating current wave produced by said oscillator in phase with said phase control signal; and phase comparison means connected for actuating said control means comprising, means connected to said separating means and to said oscillator for modulating said phase control signal and the local oscillator produced wave to form a modulated wave, means connected to said modulating means for detecting the modulation envelope of said modulated wave; and means including a pair of oppositely poled unilaterally conducting devices coupled for alternating current only to said envelope detecting means for establishing a direct current control signal for impression upon said frequency control means.

6. In a color television receiver for phase modulated subcarrier wave operation, the combination comprising: means separating an alternating current phase control signal from received television signals; local oscillator means to produce an alternating current wave having the same frequency as that of said phase control signal; control means for establishing and maintaining the alternating current wave produced by said oscillator in phase with said phase control signal; and phase comparison means connected for actuating said control means comprising, means connected to said separating means and to said oscillator for modulating said phase control signal and the local oscillator produced wave together to form a modulated wave, means including an output circuit having a time constant of the same order of magnitude as the period of said phase control signal connected to said modulating means for detecting the modulation envelope of said modulated wave; and means including a pair of oppositely poled unilaterally conducting devices coupled for alternating current only to said envelope detecting means and including an output circuit having a time constant which is greater than the time constant of the output circuit of said envelope detecting means for establishing a direct current control signal for impression upon said frequency control means.

References Cited in the file of this patent

UNITED STATES PATENTS

| | | |
|---|---|---|
| 2,473,790 | Crosby | June 1, 1949 |
| 2,475,779 | Crosby | July 12, 1949 |
| 2,594,380 | Barton et al. | Apr. 29, 1952 |
| 2,609,535 | Harmon | Sept. 2, 1952 |
| 2,640,939 | Staschover | June 2, 1953 |
| 2,641,693 | Labin | June 9, 1953 |